United States Patent Office 2,872,221
Patented Feb. 3, 1959

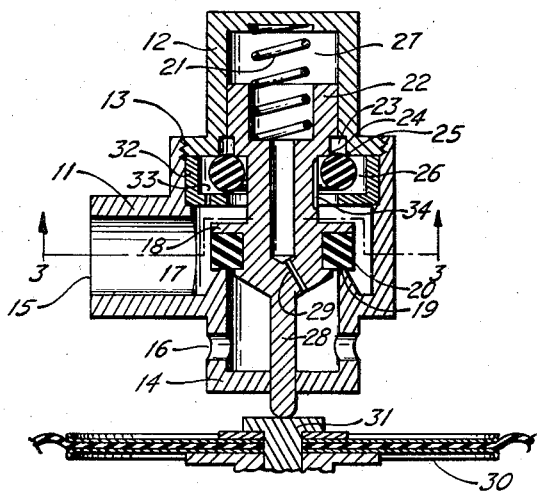

2,872,221

VALVE SEAL

Henry L. Burns and Russell L. Rollofson, Portland, Oreg., assignors to Alar Products, Inc., a corporation of Ohio Application February 1, 1956, Serial No. 562,831

3 Claims. (Cl. 286—26)

Our invention relates to balanced valves and particularly to the sealing arrangement in such balanced valves.

In the design of fluid flow and pressure regulating devices, it is advantageous to minimize the influence of variations in the supply pressure of the fluid. In case of a simple poppet-type valve, the supply pressure of the fluid entering the valve casing will load the valve seat in accordance with the pressure differential multiplied by the seating area of the valve.

In many uses of valves wherein good pressure regulation is required, it is necessary to counteract or minimize load variations. This is especially true of variations resulting from wide spreads in supply pressure or from large, high capacity valves. It is the practice in pressure regulator design to nullify or reduce load variations by using multi-stage regulation, correspondingly large controlled diaphragm areas, extended mechanical leverages and/or by balanced valves.

The present invention is directed to a balanced valve design for controlling or minimizing variations in the supply pressure of fluid entering the inlet of the valve casing. A balanced valve is one in which the inlet pressure forces, tending to move the valve in a valve seating direction, are counterbalanced by exposing a similar or other area in the opposite direction to the same inlet pressure, in other words, inlet pressure tends to open a valve as well as close a valve in a balanced valve construction. The valve may be completely balanced, in which case the opposite areas are arranged to equalize the biases imposed by the inlet pressure, or the balance may be partial, in which case the respective areas are proportioned to have the biases toward opening and closing actions in a desired proportion.

There are a number of valve balancing arrangements that have been used, but each of these has its limitations. In the use of double and opposing valve seats, there are presented problems of fabrication, accuracy and vulnerability of leakage through one or the other of the valve seats. In the use of a diaphragm or bellows opposite a valve seat to the outlet, there is a limitation in the allowable pressure range by reason of the limitations on the strength of the diaphragm or of the bellows material.

A balanced valve construction may have an opposing or balancing piston counteracting or opposing the valve action opening and closing the outlet. If the opposing or balancing piston is to be leak-tight, it requires a sealing means, such as an O-ring of rubber-like material. O-rings are well known as having annular configurations and a round cross-section in an uncompressed condition. They are resiliently compressible and expand again to their normal shape when pressure is removed. In practice, the O-ring seals create variable and unpredictable load variation by reason of their slide friction and more so by their breakaway friction. The O-ring on the opposing or balancing piston of the balanced valve construction thus creates problems in imposing frictional resistances of varied and unpredictable degrees to the operation of the opposing or balancing piston.

An object of my present invention is to provide an improved sealing arrangement for a balanced valve construction.

Another object is the provision of an arrangement of parts for providing an efficient seal between the piston and the casing of a balanced valve construction wherein a sealing engagement is maintained between the seal, the movable piston and the casing in which the piston reciprocates.

Another object is an improved sealing arrangement allowing retractions of the piston or valve body in a balanced valve while maintaining a seal between the piston and the seat of the seal.

Another object is the provision for eliminating sliding friction and breakaway friction in a seal between a reciprocating piston and the seat on the valve housing upon which the seal seats.

Another object is the provision of a seal for the opposing or balancing piston of a balanced valve construction in which the seal rolls along its axis to maintain sealing engagement during movement of the piston.

Another object is the provision for utilizing the flexible rollability about itself and along its axis of an O-ring of rubber-like material for the sealing of the parts in the operation of the balanced valve construction.

Another object is the provision for maintaining a seal between a valve housing and a piston movable in the valve by means of a sealing member which rolls about itself along the axis of the piston as the piston reciprocates.

Another object is the provision for sealing a gap between a valve housing and piston reciprocal therein by means of an O-ring seating on opposite sides of the gap and rollable about itself to maintain the seating during movement of the piston.

Other objects and a fuller understanding of our invention may be had by referring to the following description and claims, taken in conjunction with the accompanying drawing, in which:

Figure 1 is a longitudinal sectional view of a balanced valve construction incorporating our invention and in which the valve is shown in a closed position;

Figure 2 is a sectional view like that of Figure 1 but in which the valve is shown in an open position; and Figure 3 is a cross-sectional view of our valve construction taken through the line 3—3 of Figure 1.

In our valve construction there is a casing or housing 11 in which is located a reciprocal piston or valve body 18. A casing extension 12 is threadably connected to the casing proper 11 by means of the threaded connection 13 so that the extension 12 becomes a part of the housing 11. The casing 11 has an outlet portion 14 protruding from a side thereof opposite the casing extension 12. There is an inlet opening 15 through which fluid under pressure enters the casing into the internal chamber 17 within the casing. There are outlet openings 16 in the outlet portion 14 so that fluid may flow from the chamber 17 outwardly through the outlet openings 16 when the valve is in the opened condition shown in Figure 2.

There is a seat 19 of annular form which divides the chamber 17 from the outlet side of the valve leading to the outlet opening 16. This seat 19 has a raised annular edge extending up from the wall of the casing and the edge of the seat 19 is disposed in a flat plane and disposed to provide a seat for the valve seal 20, controlling flow to the outlet.

Prior to the threaded engagement of the casing extension 12 to the casing 11, the valve piston or body 18 is moved downwardly into the casing to the position shown in the drawing. A piston stem 28 extending from the one end of the piston 18 protrudes through an opening in the bottom wall of the outlet portion 14 and is movable in a sliding fit through this opening so that the piston may reciprocate between the positions shown in Figures 1 and 2.

If desired, a coil spring 21 may be positioned within the cavity 27 within the casing extension 12 so as to resiliently urge the piston 18 toward the seat 19 and to urge the piston stem 28 outwardly to protrude as shown in Figure 1. In other cases, the bias of the spring 21 may not be required and may be eliminated. The piston or valve body 18 has a head portion 22 which reciprocates within the cavity 27 of the casing extension 12 in a sliding fit. It is desired to form a good seal between the sliding head 22 and the wall of the casing, including the casing extension 12.

In our preferred arrangement, there is a gap or space 23 provided between the piston or body 18 and the casing surrounding the body or piston 18. This gap 23 is defined by an annular ledge having an annular corner 24 on the piston 18 and by an annular shoulder or ledge having a corner 25 on the casing surrounding the piston. In the position shown in Figure 1, the ledge corners 24 and 25 are concentric to each other and to the valve body 18 and are arranged in substantially the same transverse plane. The gap 23 extends in an axial direction from the ledge corners 24 and 25, that is, away from the chamber 17 of the housing.

An O-ring 26 of rubber-like material is positioned concentric with and around the piston 18 adjacent to the ledge corners 24 and 25. This O-ring 26 may be made of any suitable rubber or rubber-like material, such as for example a silicone rubber. The O-ring 26 is annular and also has a round cross-section, as seen in the cross-sectional view of Figures 1 and 2. It is resiliently flexible and is of a nature that it will roll about itself along its axis. In other words, the O-ring 26 may be rolled inside out upon the centers of its round cross-sections so as to move in an axial direction without sliding.

When in use, the O-ring 26 is held tightly in position across the gap 23 by the fluid pressure in the chamber 17. When there is no fluid pressure within the chamber 17, then the O-ring 26 is held proximate to the gap 23, that is, closely adjacent to the ledge or shoulder corners 24 and 25, by a retaining ring 32. Also the piston 18 tends to hold the O-ring 26 in accurate axial alignment. The retaining ring 32 has a small vent 33 for assuring that fluid pressure in the chamber 17 reaches the outer walls of the O-ring 26 and thus the fluid pressure may press on the O-ring 26 on all sides of the O-ring from the chamber 17 toward the ledge corners 24 and 25. Also to assure access of the fluid pressure to the O-ring 26, a vent 34 is provided along the side of the piston 18 radially inward of the O-ring 26. In valve applications where inlet fluid pressure is substantially constant and holds pressure, then the retaining ring 32 may be eliminated.

Concentricity of the O-ring 26 with the gap 23 is provided by the fit of the O-ring 26 around the piston 18. Axial displacement of the O-ring may also be prevented by having it more closely fit with the retaining ring 32 than around the piston 18 as shown.

The sealing gap 23 is of sufficient width (preferably up to one-half of the diameter of the round cross-section O-ring 26) to allow the O-ring to form two circular line contact seals. One of these contact seals is at the annular ledge corner 24 and the other of these contact seals is on the annular ledge corner 25. The vents 33 and 34 aid in assuring the contact of the O-ring 26 with the ledge or shoulder edges 24 and 25.

It is to be noted that when the piston or valve body 18 is in the closed position of Figure 1, the insert seal 20 carried on the piston 18 firmly seats upon the seat 19 of the valve casing so that the outlet is closed. In this condition, the bias of fluid pressure within the internal chamber 17 is such as to urge the piston 18 both downwardly to a closed position and upwardly to an open position. In other words, the bias provided by the fluid pressure counterbalances so that the force tending to close the valve is balanced by a similar force tending to open the valve. A duct or vent 29, made up of a central opening in the body 18 and a conduit lead therefrom, is provided through the piston 18 to provide communication between the cavity 27 and the outlet side of the valve. If desired, the cavity 27 may be vented to another location in the system, but in most instances it would be vented through the duct 29 to the outlet side as shown.

The piston 18 may be actuated either manually or mechanically in any of a number of ways. For purposes of simplicity, we have shown the piston 18 to be actuated by a pressure-sensitive diaphragm 30 which has a bearing portion 31 engaging the extreme end of the piston stem 28. Movement of the diaphragm 30 and its bearing portion 31 upwardly in Figure 1 raises the piston 18 to open the valve outlet between the seat 19 and the insert seal 20. When this is done, the parts move to the position shown in Figure 2 and fluid within the internal chamber 17 flows out between the insert seal 20 and the valve seat 19 and thence out through outlet opening 16.

As the piston 18 moves from the position shown in Figure 1 to the position shown in Figure 2, while the O-ring 26 is pressed against the corners 24 and 25 by fluid pressure, the O-ring rolls about itself along its axis so as to maintain sealing engagement between the O-ring and the ledge corners 24 and 25. When in the position of Figure 2, the O-ring is still retained by fluid pressure tightly against the ledge corners 24 and 25 by the fluid pressure in the chamber 17. The resilient O-ring may be slightly indented against the corners 24 and 25 against which it is firmly held by the fluid pressure.

It is noted that the sealing engagement is maintained by the rolling action of the O-ring rather than by any sliding or frictional movement of the O-ring against the parts of the valve, piston and casing. A good sealing engagement is maintained between the piston and the casing so as to seal off the cavity 27 from the chamber 17 in both the open and closed positions and also during the movement between those positions. There is no frictional resistance or breakaway resistance by reason of the described action. The influence of the O-ring 26 on valve action will be constant, predictable and small in magnitude.

While the drawing and above description refer to a valve in which the effective areas of the piston 18 and seat 19 are in substantially equal balance, there may be uses for the construction in which the effective areas subject to the biasing pressure of the fluid system are not equal. This may be done by arranging such dissimilarity in the effective areas of the piston and valve seat controlling the biasing of the piston as to give the desired performance characteristics.

This valve design has advantages in its considerable range of usable inlet pressures and in its permissible valve opening without leakage and without undue resistance to movement by the O-ring 26. Considerable fluid pressures can be tolerated and accommodated before restriction of the gap 23 by extrusion of the O-ring 26 into the gap 23. Also the design provides for operation at relatively low inlet fluid pressures sufficient to maintain the O-ring in sealing engagement. By a suitable choice of material for the O-ring, such as an appropriate silicone rubber, the valve has uniform operating characteristics over wide temperature ranges.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a balanced valve construction having a piston slidably retractible into a cylindrical cavity formed in a side of the valve housing, improved sealing means between the piston and walls of the housing comprising an annular ledge formed on the piston and concentric therewith, an annular ledge formed on the housing adjacent said cylindrical cavity and concentric therewith, said ledges being spaced apart radially of said piston to provide an annular gap therebetween, the mean diameter of said gap being substantially the same as the diameter of said cylindrical cavity, and an O-ring of rubber-like material and round cross-section positioned around said piston adjacent said ledges, the mean diameter of the O-ring also being substantially the same as the diameter of said cylindrical cavity, said O-ring being adapted to roll longitudinally of its axis around the centers of its cross-sections as said piston reciprocates and to sealingly engage with both said ledges upon being urged toward said cavity by fluid pressure in said housing to maintain a seal between said piston and said cavity during movement of the piston.

2. In a balanced valve construction having a cylindrical piston retractable into a cylindrical cavity in the valve housing upon movement of the piston to opening position, said piston and cavity corresponding with a reference cylinder disposed in axial alignment therewith, improved sealing means between the piston and the valve housing around the cavity comprising a radially outwardly extending annular shoulder on said piston, a radially inwardly extending shoulder on said housing around said cavity, the edges of said shoulders being substantially equidistantly spaced from said reference cylinder and being disposed on opposite sides thereof, and an O-ring of rubber-like material and round cross-section positioned around said piston adjacent said cavity, said O-ring being adapted to sealingly engage with both said shoulder edges under the urging of fluid pressure in said housing on the O-ring, said O-ring rolling along its axis to maintain said sealing engagement with said shoulder edges as the piston reciprocably moves in the housing.

3. In a balanced valve construction having a cylindrical piston retractable into a cylindrical cavity in the valve housing upon movement of the piston to opening position, said piston and cavity corresponding with a reference cylinder disposed in axial alignment therewith, improved sealing means between the piston and the valve housing around the cavity comprising a radially outwardly extending annular shoulder on said piston, a radially inwardly extending shoulder on said housing around said cavity, the edges of said shoulders being substantially equidistantly spaced from said reference cylinder and being disposed on opposite sides thereof, an O-ring of rubber-like material and round cross-section positioned around said piston adjacent said cavity, said O-ring being adapted to sealingly engage with both said shoulder edges under the urging of fluid pressure in said housing on the O-ring, said O-ring rolling along its axis to maintain said sealing engagement with said shoulder edges as the piston reciprocably moves in the housing, and retaining means in said housing for retaining the O-ring proximate to said shoulder edges in the absence of fluid pressure in the housing.

References Cited in the file of this patent

UNITED STATES PATENTS

| | | |
|---|---|---|
| 2,294,702 | Van Der Werff | Sept. 1, 1942 |
| 2,431,437 | Van Der Werff | Nov. 25, 1947 |
| 2,666,659 | Audemar | Jan. 19, 1954 |

FOREIGN PATENTS

| | | |
|---|---|---|
| 616,262 | Great Britain | of 1949 |
| 468,803 | Italy | of 1952 |